Figure 1:
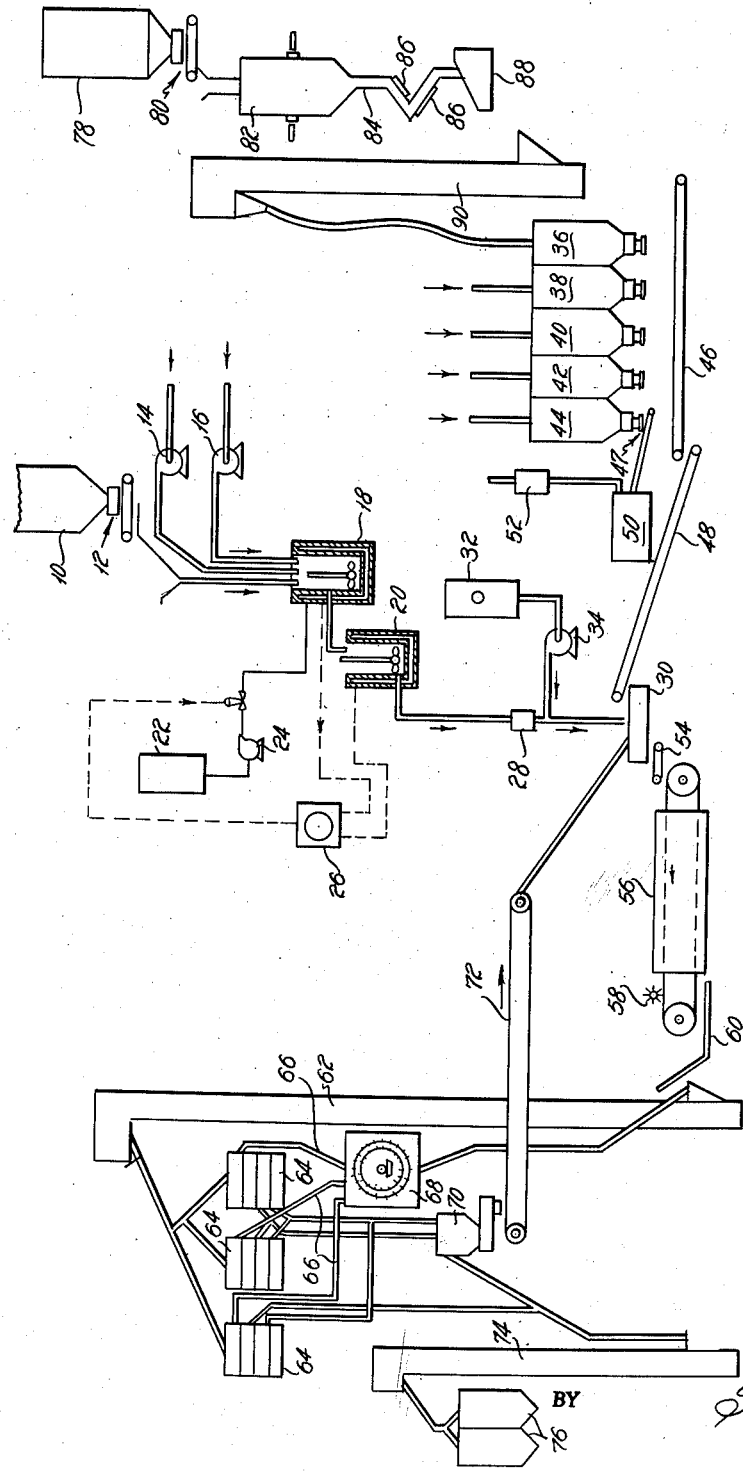

Feb. 5, 1963 V. A. RENNER 3,076,700
FERTILIZER COMPOSITIONS AND PROCESS
Filed Oct. 31, 1957 3 Sheets-Sheet 1

INVENTOR
VICTOR A. RENNER
BY
ATTORNEYS

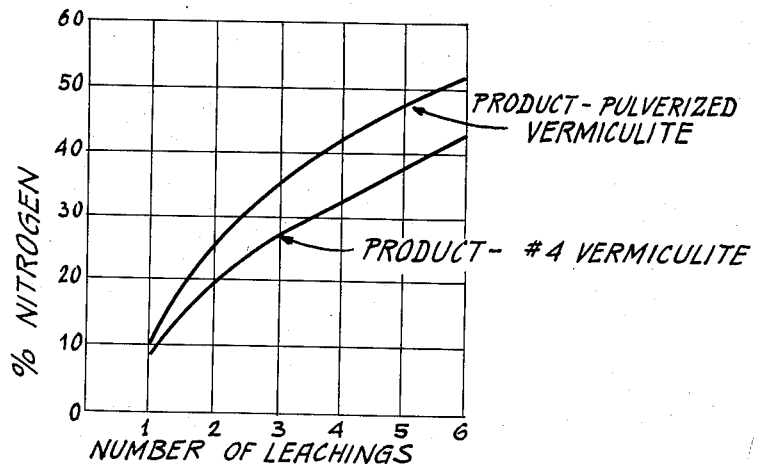
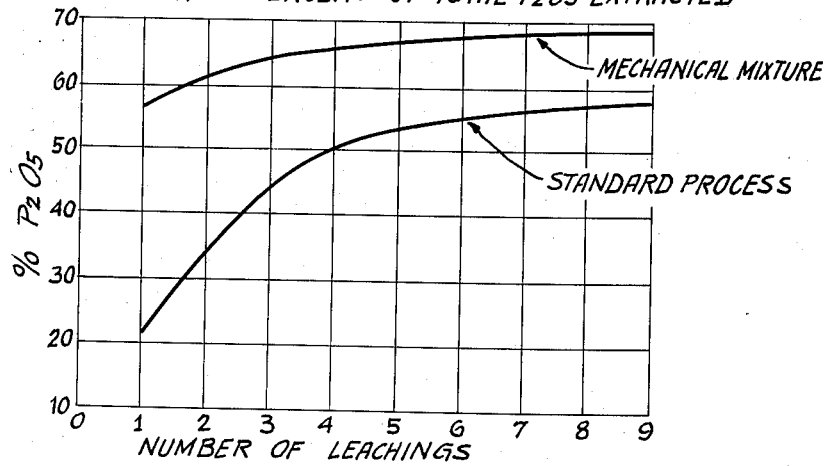
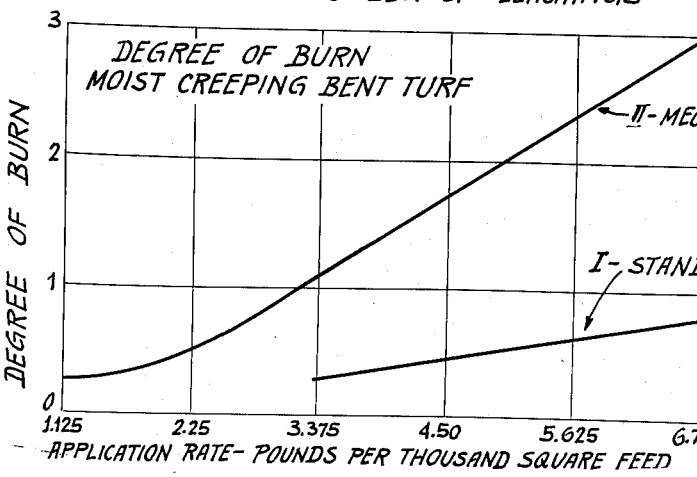

Feb. 5, 1963  V. A. RENNER  3,076,700
FERTILIZER COMPOSITIONS AND PROCESS
Filed Oct. 31, 1957  3 Sheets-Sheet 3
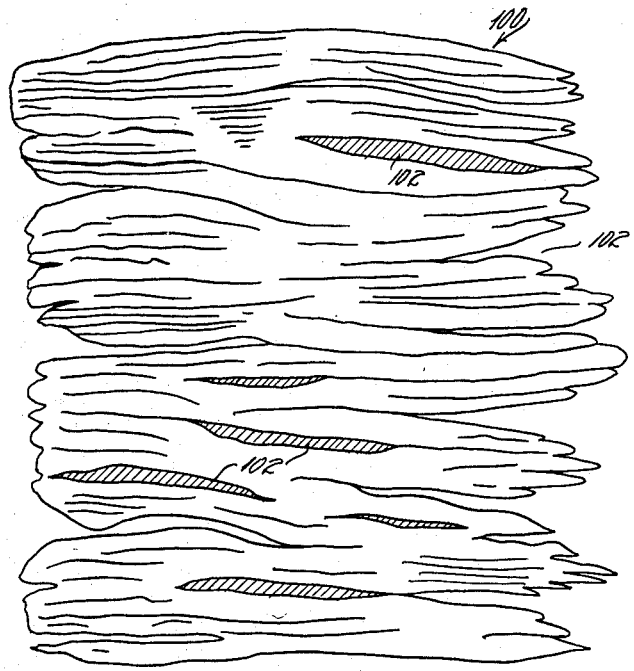
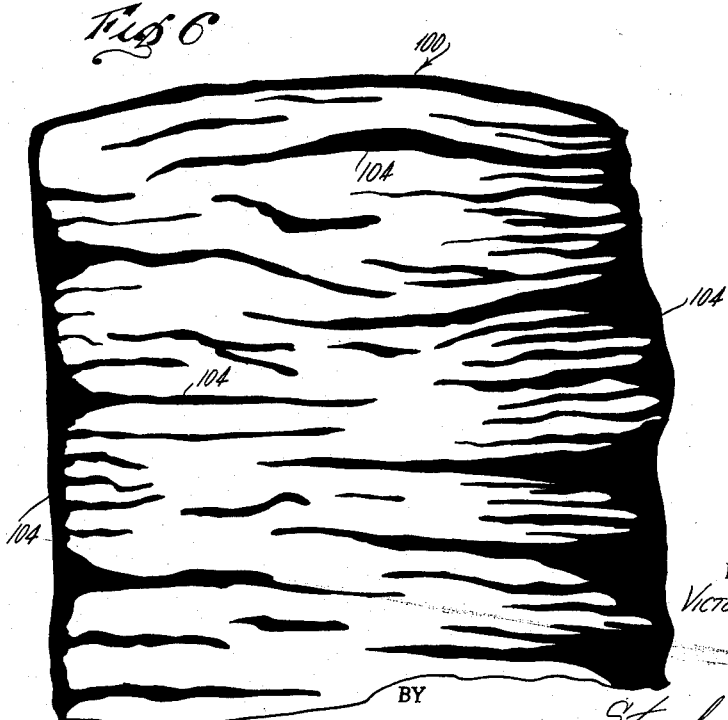
INVENTOR
VICTOR A. RENNER
BY
ATTORNEYS

United States Patent Office

3,076,700
Patented Feb. 5, 1963

3,076,700
FERTILIZER COMPOSITIONS AND PROCESS
Victor A. Renner, Marysville, Ohio, assignor to O. M.
Scott and Sons Company, a corporation of Ohio
Filed Oct. 31, 1957, Ser. No. 693,629
9 Claims. (Cl. 71—29)

This invention relates to an improved fertilizer composition and a process for manufacturing the same. The fertilizer compositions may be tailored to range from primarily a high nitrogen content fertilizer to a "complete fertilizer" and are particularly suited for application on lawn turf grasses and the like.

The term "complete fertilizer" is commonly used in art to designate a mixture containing the three primary plant nutrients, nitrogen, phosphorous, and potassium. In the fertilization of turf, a proportionately higher nitrogen content is advantageous and it has been found desirable to supply a high level of nitrogen throughout the growing season in order to maintain the growth and color of a well kept turf.

In most cultivated crops it is possible to apply the fertilizer materials either prior to planting or to side dress the plants after they have been established. The conventional method of applying solid fertilizers to turf is unlike that of most other crops. Of necessity, the application is made over the plant's covering foliage and soil alike. Due to the method of application, inorganic salts such as ammonium sulphate, ammonium nitrate, calcium phosphate, chloride or sulphate of potash, separately, or in a complete fertilizer mixture, need to be applied with great care so that severe injury to turf does not result. The nitrogenous salts, which are required in greater amount for high nitrogen fertilizers, are most injurious. This injury, which results from desiccation of the grass leaves, is commonly called burn.

The inorganic salts of nitrogen are all very soluble, thus making the nitrogen available to plants almost entirely at once, giving accelerated peak growth response almost immediately after application. The soluble salts are also readily leached from certain levels and are thereby lost.

In an attempt to overcome objectionable characteristics of the inorganic salts, natural processed organic materials such as soybean meal, cottonseed meal, processed leather scraps, animal tankage, poultry manure and sewage sludge have been used separately or in combination with the organic salts. This, however, has been only partially successful.

The organic materials first need to undergo bacterial decomposition to release nitrogen. This proceeds very slowly or not at all under cool weather conditions and at a very accelerated rate under hot weather conditions. Thus the nitrogen may not be available under cool spring and fall weather conditions but is available at approximately the same rate as inorganic salts during hot humid weather. Decomposition is often so rapid as to produce effects similar to so-called inorganic salts.

Attempts to overcome objectionable physical characteristics of mixed fertilizers, including caking, poor flow ability, and segregation, have included the development of granulation processes. The standard method of granulating fertilizers is to add 10 to 20% water, either directly to the dry ingredients, or as part of the liquid constituents to form a pasty mass or slurry. The mixture is kneaded or mixed in paddle mixers, then rolled or tumbled in granulators to compact the mixture into high density, spherical particles in the −6+40 (U.S. Standard) screen range of particle size. In many processes these granules are dried to remove excess moisture. Such products are of ideal physical condition for use in many phases of agriculture, but due to the particle size and density they are difficult to use in typical lawn spreaders. Furthermore, the larger particle size fraction tends to lodge in the foliage of fine turf grasses causing burn.

It has been found that the condensation product of urea and formaldehyde when reacted under proper conditions provide an excellent source of nitrogen in a slowly soluble and available form, the nitrogen being present at a concentration sufficient to enable the use of such a product as a source of nitrogen for a high nitrogen analysis fertilizer mixture. The condensation products may be formed in the presence of water-soluble fertilizing ingredients to thus form a coating of resin about the ingredients to make them available over longer periods of time. The resin, either alone or in combination with other fertilizing ingredients is dispersed in the void spaces between individual platelets of finely divided expanded vermiculite which further enhances its slow release over extended periods.

The primary object of the invention is thus to provide fertilizer compositions adapted for effective application to turf without "burning" or other injurious action which comprise the condensation reaction product of urea and formaldehyde coated either alone or in combination with other fertilizing ingredients on the surfaces of and impregnated between the platelets of finely divided expanded vermiculite for slow release of agronomically available ingredients over long periods. A related object of this invention is to provide such fertilizer compositions which have homogeneous particles that are free flowing.

Another object of this invention is to provide a complete fertilizer composition having an especially high percentage of insoluble and available nitrogen, the nitrogen and other fertilizing ingredients being slowly released over extended periods to provide continuous fertilization.

A further object of this invention is to provide a fertilizer composition in which a slowly soluble urea formaldehyde resin, containing a high percentage of insoluble but available nitrogen, is impregnated between the layers of the micaceous plates of vermiculite granules to render the resin less subject to leaching.

Another object of this invention is to provide a fertilizer composition in which all solid ingredients including soluble phosphate and potash are coated with a partially soluble resin to render them more slowly soluble, thus to minimize hazards of burn.

Another object of this invention is to provide a fertilizer composition of light crumb structure and low density having superior handling characteristics using a suitable urea formaldehyde resin for agglomerating lightweight expanded vermiculite with dense materials such as triple superphosphate and muriate of potash.

Other objects and advantages of the invention will become apparent from the following detailed description taken in conjunction with the accompanying drawings in which:

FIGURE 1 is a diagrammatic view of a form of apparatus for carrying out the continuous process of this invention;

FIGURES 2, 3 and 4 are graphs illustrating results obtained with the products of this invention, FIGURE 2 relating to Example VII and FIGURES 3 and 4 relating to Example VIII; and FIGURES 5 and 6 are greatly enlarged sketches illustrating a cross-section of a particle of expanded vermiculite before and after impregnation with fertilizing ingredients respectively.

In accordance with the present invention, it has been found that an excellent method of preparing a granular "complete" fertilizer mixture with slowly soluble ingredients may be carried out by utilizing the condensation product of an aqueous solution of urea and formaldehyde to coat and agglomerate particles of other constituents. For this purpose urea and formaldehyde are reacted in aqueous solution under alkaline conditions to produce a solution containing a preponderance of urea and formaldehyde in the forms of methylol ureas. This solution is then dispersed on properly sized expanded vermiculite alone or together with properly adjusted acidic fertilizer ingredients and heated in a blender and drier to promote a condensation reaction of the soluble methylol ureas. During the condensation reaction, the methylol urea solution is converted to solid resinous methylene urea compounds which have a high degree of insolubility.

The molar ratio of urea to formaldehyde should be maintained in the range of 1:1 to 3:1, however, a molar ratio of 1.6:1.0 to 2.4:1.0 is preferred in order to produce a nitrogen fraction with more desirable characteristics of ⅓ to ½ insoluble nitrogen with the insoluble nitrogen having a desirable degree of availability. During the solution stage the pH of the solution should be maintained between 7.0 to 9.5. The temperature of the solutions during dissolution of urea and the primary reaction phase is preferably maintained in the range of 30 to 60° C. in order to facilitate dissolution of urea and speed the reaction of urea and formaldehyde. Either hot water or steam circulating through jackets may be used to maintain the temperature of the reaction mixture.

It should be understood that instead of starting with all of the urea in solid form, it may be supplied as a solution of urea or as an alkaline solution of urea and formaldehyde which, on combining, form soluble methylol ureas. Such solutions are available commercially and may be readily substituted to form at least part of the urea solution. Likewise, formaldehyde can either be used in the gaseous phase, 37% solution, or supplied entirely or in part by commercially available urea formaldehyde solutions.

In order to produce a product with a desirable rate of availability of the nitrogen for plant assimilation, the final product should have a pH of 4.5 or over, but when the pH of the product is higher than 6.5 the condensation proceeds less satisfactorily and the nitrogen content is more readily available for plants than deemed desirable. It has been found that with proper selection of ingredients, modified forms of phosphate compounds as a minimum concentration of 5.0% $P_2O_5$ of the composition may be utilized to buffer the product at varying pH levels within the desired range of 4.5 to 6.5.

Di-calcium phosphate or phosphate materials such as triple superphosphate, superphosphate and phosphoric acid modified with alkaline materials such as ammonia and hydrated lime may be used to supply the $P_2O_5$ content and to buffer the fertilizer mixture. From the standpoint of efficient and economical operation as well as close control of the pH it has been found advantageous to use triple superphosphate or superphosphate ammoniated with anhydrous ammonia.

Aqua ammonia or various ammoniating solutions may also be used providing they do not contain an excessive amount of acid ions to prevent attaining the desired pH level. When anhydrous ammonia is used to ammoniate triple superphosphate, as for example in a TVA type ammoniator, the resulting product is of desirable physical characteristics for use in the process. The ammoniated product may be cooled to room temperature or utilized advantageously at the ammoniator exit temperature of approximately 130–150° C. to promote the condensation reaction of the urea formaldehyde when incorporated with the other ingredients.

According to this invention, high analysis nitrogen products of lightweight crumb or granular composition may also be prepared without using a phosphatic fertilizer material. This is accomplished by using an inorganic acid, such as sulfuric which is preferred, as an impinging spray on the methylol urea solution or fed into the stream as it is being sprayed on the selected grade of vermiculite. It has been found that acid may be added in sufficient quantity to adjust the pH of the solution to a range of pH 3.0 to pH 4.0 to speed the condensation reaction with the resulting mixture slowly being buffered by the vermiculite to the desired range of pH 4.5 to 6.5. The choice of vermiculite with proper chemical characteristics and within the desired pH range is important.

A preferred vermiculite has a pH of about 6 with the following chemical analysis:

| | |
|---|---|
| $SiO_2$ | 40%. |
| $MgO$ | 22%. |
| $Al_2O_3$ | 15–18%. |
| $Fe_2O_3$ | 10%. |
| $K_2O$ | 5–8%. |
| $CaO$ | 1%. |
| $Cr_2O_3$ | Less than 1%. |
| $Mn_3O_4$ | Do. |
| $P_2O_5$ | Trace. |
| $S$ | Do. |
| $Cl$ | Less than 1%. |
| $H_2O$ | Do. |

The details of this invention can be better understood by referring to the system of the attached schematic drawings, illustrating typical examples of processing, it being understood of course that the practice of the invention is not limited thereto.

Solid urea from a synchronized batching hopper 10 is fed by a continuous gravimetric feeder indicated at 12, such as a Jeffrey Waytrol feeder, and formaldehyde and water are continuously fed by metering pumps 14 and 16 respectively to a series of jacketed reaction vessels 18 and 20. The gravimetric feeder and metering pumps are so adjusted that proper amounts of the desired reactants will be delivered in a given period of time. The temperature of the solution is closely controlled by hot water or steam circulating continuously through the jackets of the reactors. A caustic solution such as sodium carbonate or sodium hydroxide, etc., is added from a storage tank 22 by a metering pump 24 to reaction vessel 18. The addition of the caustic solution is closely controlled by automatic control equipment 26 to maintain the pH of the solution in the range of 7.0 to 9.5. The overflow from the first reactor 18 is the feed for the following reactor 20. The number or size of reactors required to obtain a satisfactory solution and provide sufficient holding time for reaction of the urea and formaldehyde depends on the production rate, concentration of the solution and heating efficiency of the system. A series of two to four reactors has been found satisfactory for proper dissolution and reaction in the continuously fed system. The reacted solution, consisting principally of methylol ureas, is fed by a metering pump 28 to a double shaft jacketed paddle mixer 30 which may be heated by means of steam or hot water. The addition of an acid solution from a tank 32 by a metering pump 34 to the urea formaldehyde solution by an impinging spray prior to dispersal on solid fertilizing ingredients is optional when formulating a product containing a phosphatic buffer. If desired, the acid may be sprayed directly into the mixer 30 in an amount to adjust the pH of the resin solution to a range of 3.0 to 4.0 to initiate a condensation reaction.

Finely divided expanded vermiculite and the usual fertilizer solids, selected in accordance with the fertilizer composition desired and which may include muriate of potash, dolomite or the like, superphosphate, and triple superphosphate, respectively, are continuously fed at prescribed flow rates from bins 36, 38, 40, 42 and 44, respectively, by conventional gravimetric feeders to conveyors 46 and 48 which deliver to the mixer 30. The vermiculite buffers the finished product to a desired pH of 4.5 to 6.5. It should be understood of course, as pointed out hereinbefore, that when materials such as acid triple superphosphate or phosphoric acid are used in the formulation, they must be modified with ammonia solutions, lime or sodium carbonate (soda ash), or other suitable materials in order to achieve the desired pH level. Vermiculite alone does not have the buffering capacity required for any substantial percentage of triple superphosphate or the like.

The triple superphosphate is fed first from bin 44 by means of a continuous gravimetric feeder indicated at 47 to a TVA type continuous ammoniator 50. Anhydrous ammonia is fed to the ammoniator under pressure at closely controlled rates through a differential pressure metering cell (not shown) controlling a pneumatic valve 52. After ammoniation, the phosphate is fed by conveyor 48 together with the other selected fertilizer solids and the vermiculite to the paddle mixer 30. The urea formaldehyde solution with or without acid addition is dispersed on the fertilizer solids and vermiculite by spray nozzles while being agitated in the mixer. Some of the smaller fertilizer solids are carried by the resin solution between the vermiculite platelets but most are coated by the resin on the outside surfaces of the vermiculite particles as the majority of the solids are too large to fit between the platelets. This is illustrated by FIGURES 5 and 6 of the drawings wherein in FIGURE 5 there is shown a greatly enlarged section of an expanded vermiculite particle indicated generally at 100 having void spaces 102 throughout the body thereof. FIGURE 6 illustrates the particle 100 as it appears generally after it has been coated and impregnated with the resin solution and fertilizing ingredients as described hereinabove and indicated by the blacked-out portions 104.

The reaction that takes place in mixer 30 is exothermic. This reaction may be aided by heating the solid constituents to a temperature up to 150° C. before they are introduced into the mixer 30, but in any event the constituents should be at a temperature of at least 15° C. Actual heating of all the constituents may not be necessary, as for example, the heat of reaction from ammoniation of the triple superphosphate may be utilized as well as heat from the process of expanding vermiculite, to be described hereinafter.

After mixing, the agglomerated product is fed from mixer 30 at a temperature of about 25° to 60° C by conveyor 54 into a continuous conveyor drier 56 operating at a drying temperature of about 121 to 135° C. in the first zones and 95 to 100° C. in the final drying stages toward the discharge end. The maximum temperature reached by the product during drying is about 100° to 105° C. and approximately ten minutes are required for the drying operation. Condensation of the resin is completed in conveyor drier 56 and the product dried to 2% moisture after which primary crushers 58 break up the friable cake into particles varying from lumps approximately 1 inch in diameter to satisfactory product size of −10+70 mesh range which are then fed by means of a conveyor 60 to an elevator 62 which delivers to a series of screens 64 such as forty-eight inch diameter "Sweco" screens. The oversize particles are delivered through chutes 66 or by a common collecting belt (not shown) to a cage mill 68 whereupon the particles are reduced in size and recycled by elevator 62 to the screens 64. Depending on product formulation, 20 to 70% of drier 56 output is recycled through mixer 30 my means of a continuous feeder 70 connected by chutes to the screens 64 and a conveyor belt arrangement 72. After sizing, the finished product is delivered by elevator 74 to a series of packaging bins 76.

The basic reacted urea formaldehyde solution containing methylol ureas may be dispersed on the acidic solids in mixer 30 using some 20 to 70% of the dried and sized product as recycle to provide a favorable liquid-solids ratio in the mixer. An acid solution may be added as a spray from tank 32 impinging on the methylol urea solution while being sprayed on the solids. The methylol urea solution may also first be mixed with the acid solution in a pump such as the "Moyno" pump described in U.S. Patent Nos. 2,512,764, 2,028,407 and 2,085,115, or by propelling the mixed solution through a length of flexible tubing whereupon partial condensation occurs forming a slurry or creamy paste before it is dispersed on the other fertilizer constituents. Although sulfuric acid is preferred, other acids such as phosphoric, nitric, hydrochloric, formic and the like or solutions of acid salts such as sodium acid pyro phosphate may be used to catalyze the condensation reaction.

In order to produce a product of desirable physical qualities it has been found desirable to screen all solid raw materials to pass a −14 mesh (U.S. Standard) screen with approximately 90 to 95% passing a −20 mesh screen. The triple superphosphate for bin 44 should be screened and milled for −20 mesh for greatest ammoniation efficiency and for best results when introduced into the complete fertilizer mixture.

It is important to provide for variable points of addition of both dry solids, resin solution and recycle. Premixing of the dry solids can thus be accomplished in the same mixer. The physical characteristics of the final product can be controlled to some degree by providing variable points of addition of the resin solution and the recycle. The acidic fertilizer solids together with heat supplied by steam injected into the mixture, heat applied to the mixer by means of hot water or steam jacketing and by the through-circulation type conveyor drier cause the methylol urea to undergo a condensation reaction and thus to form desirable solid resinous methylene urea compounds. Condensation is initiated in the mixer and completed during the drying operation.

The resulting condensation products act as a binder to cement together the smaller particles of solids and to coat these particles with partially insoluble resinous films rendering them more slowly available at a predeterminable rate.

In addition, a high percentage of the resin is impregnated between the micaceous layers of the vermiculite, rendering these resins even more slowly soluble and available to plants. The manner and degree of impregnation are clearly illustrated diagrammatically in the sketch of FIGURE 6 described hereinbefore. While it is difficult to set forth specific ranges of solid fertilizing ingredients that may be combined with vermiculite, because of their varying densities, it has been found generally that formulations containing from 15 to 30 parts vermiculite, 20 to 75 parts urea formaldehyde resin, and 25 to 50 parts other fertilizing ingredients, the parts being in parts by weight, provide excellent results. The solid fertilizing ingredients may of course be eliminated if desired and also various compositions may be tailored to suit specific applications required by varying turfs, crops, etc. In general, examples of suitable fertilizing ingredients which may be used are (a) phosphatic compounds, such as monoammonium phosphate, diammonium phosphate, dicalcium phosphate, phosphoric acids modified with hydrated lime, potassium phosphates; (b) potassium compounds such as potassium sulfate, potassium nitrate, potassium phosphates and kainite and (c) nitrogenous materials such as ammonia solutions, ammonium nitrate solutions, ammonia urea solutions, potassium nitrate, sodium nitrate, ammonium phosphates and ammonium sulfate.

The expanded vermiculite may be processed from vermiculite ore and supplied to bin 36 as a part of the continuous process of this invention, or it may be purchased commercially at a desired size and composition. Also illustrated in the flow diagram of FIGURE 1 is suitable apparatus for processing vermiculite wherein vermiculite ore is delivered from a hopper 78 by a continuous feeder indicated at 80 to a furnace 82 operating at a temperature of from 1800° to 2000° F. to exfoliate the vermiculite ore into expanded vermiculite. The chemical composition of ore and expanded vermiculite are almost identical except for $H_2O$ content. The purpose of expanding vermiculite is to enlarge or increase its porosity or the cellular condition of its laminae.

Hot expanded vermiculite is discharged from furnace 82 and tumbles down chute 84 having a series of sections, inclined in alternating directions, which are cooled by water jackets 86. The partially cooled expanded vermiculite is discharged onto a dry table 88 such as the type disclosed in U.S. Patent 2,137,678. Stone fractions are separated by the dry table and the cleaned expanded vermiculite is transferred by elevator 90 to bin 36.

The following examples are illustrations of the practice of the invention and demonstrations of the results. All mesh sizes are U.S. Standard Sieve.

*Example I*

The ratio of raw materials used and the characteristics of a 20-10-5 ($N-P_2O-K_2O$) complete fertilizer product together with the results obtained will illustrate the practice of this invention.

| Materials: | Parts by weight |
|---|---|
| Triple superphosphate (46% APA) | 17.65 |
| Anhydrous ammonia | 0.68 |
| Muriate of potash | 6.69 |
| Expanded vermiculite (mesh −16+100) | 16.35 |
| Formaldehyde (37% solution) | 24.24 |
| Urea (45% N) | 34.39 |

All of the solid ingredients were of −20 mesh size. The triple superphosphate was first ammoniated to 3.2% N in order to buffer the final product to a pH of 5.3. As set forth hereinbefore, it is desirable to have the pH of the final product in a range of 4.5 to 6.5. The urea and formaldehyde were reacted to produce a methylol urea solution which was then dispersed on the dry solids, utilizing −60 mesh fines and recycle product at 40% the rate of flow of other ingredients.

A chemical analysis after drying to a 2% moisture content indicated 20.4% nitrogen, 10.25% available $P_2O_5$ and 5.1% $K_2O$. Approximately 40% of the nitrogen was cold water insoluble and had a desirable degree of availability when assayed by Method 2.37, 2.38 AOAC, 8th Edition, 1955, Nitrogen Activity Index of Urea-Formaldehyde Compounds.

Screen analysis on such products gave approximately 92% in the range of −10+40 mesh. Less than 2% was −70 mesh. Screen analysis of the dry solids prior to agglomeration with methylene urea resin gave more than 50% in the undesirable −40 range.

Evaluation of the hygroscopic characteristics determined by exposing samples of product over sulphuric acid solutions with varying vapor pressures, showed relatively low hygroscopic tendencies. This product absorbed 8.0% moisture at 85% relative humidity over a 24-hour period at 20–25° C. compared to 20% absorption for a granulated commercial fertilizer product.

The superior flow characteristics of the condensation reaction products of urea and formaldehyde at relatively high moisture levels as compared to other fertilizer materials are well known. There is little tendency to cake when tested under the pressure of 15 pounds per square inch at a moisture content of 2–8% in a bomb-type testing device.

Agronomic burn and availability studies have indicated that a composition of this invention containing approximately 3 lbs. of nitrogen, 1.5 lbs. of $P_2O_5$ and 0.75 lb. of $K_2O$ per 100 sq. ft. can be applied to dry succulent turf without injury whereas a straight mechanical mixture of urea formaldehyde resin, triple superphosphate, muriate of potash and vermiculite at the same concentrations burned turf severely at ⅙ of the amount. Hence the utilization of the methylene urea coating to agglomerate the fertilizing ingredients with vermiculite to render them more slowly available by coating them with a partially insoluble resinous film which is impregnated in part between the vermiculite platelets is clearly demonstrated as being very efficient and useful in minimizing the burning tendency of the fertilizer mixture.

In addition, weight of grass clipped and observations of fertilized turf grasses clearly indicated that the response to this product persists approximately twice as long as obtained with mixtures containing more soluble forms of nitrogen.

*Example II*

The following formulation is an example of the ratio of raw materials utilized when dicalcium phosphate is used to make a 20-10-5 fertilizer. The results obtained were substantially the same as those of Example I.

| Materials: | Parts by Weight |
|---|---|
| Dicalcium phosphate (36% APA) | 18.58 |
| Muriate of potash | 6.69 |
| Expanded vermiculite | 15.62 |
| Formaldehyde (37% solution) | 24.24 |
| Urea (45% N) | 34.88 |

*Example III*

The following formulation is an example of the ratio of raw materials utilized when triple superphosphate is modified with lime ($Ca(OH)_2$) to produce a 20-10-5 fertilizer. The results obtained were substantially the same as those of Example I.

| Materials: | Parts by Weight |
|---|---|
| Triple superphosphate (46% APA) | 17.65 |
| Lime ($Ca(OH)_2$) | 1.10 |
| Muriate of potash | 6.69 |
| Expanded vermiculite | 15.44 |
| Formaldehyde (37% solution) | 24.24 |
| Urea (45% N) | 34.88 |

*Example IV*

The following formulation is an example of the ratio of raw materials utilized when triple superphosphate is modified with soda ash ($Na_2CO_3$) to produce a 20-10-5 fertilizer. The results obtained were substantially the same as those of Example I.

| Materials: | Parts by Weight |
|---|---|
| Triple superphosphate (46% APA) | 17.65 |
| Soda ash ($Na_2CO_3$) | 0.75 |
| Muriate of potash | 6.69 |
| Expanded vermiculite | 15.79 |
| Formaldehyde (37% solution) | 24.24 |
| Urea (45% N) | 34.88 |

*Example V*

An example of a straight nitrogen product in which sulfuric acid was used to catalyze the condensation reaction of aqueous solution of urea and formaldehyde with the expanded vermiculite acting as a buffer to adjust the pH of the mixture to the proper value is given as an illustration of a product that can be produced by this process.

| Materials: | Parts by Weight |
|---|---|
| Pelleted urea | 42.01 |
| Formaldehyde (37% solution) | 30.21 |
| Expanded vermiculite (mesh −16+100) | 27.78 |

As in the previous process the urea and formaldehyde are reacted in aqueous solution under alkaline conditions to form a solution of reaction products containing a high percentage of methylol ureas which are fed to the mixer. Sulfuric acid solution is either mixed with the methylol urea solution by an impinging spray or injected into the stream of solution being fed to the spray nozzles prior to dispersal on vermiculite granules. The addition of the acid, together with the heat supplied by the jacketed mixer and drier, catalyze the condensation of the methylol urea solution to resinous methylene urea compounds. In carrying out the process, some of the resin solution undergoes condensation to solids in the mixer with condensation being completed in the drier. Some of the product is recycled to achieve a desired liquid solid ratio.

Agronomic burn studies have indicated that this product may be applied to succulent turf grasses at a rate as high as 10 pounds nitrogen per 1000 sq. ft. without causing injurious effects. Urea at ½₀ this amount causes serious burn to turf during hot summer weather. The degree of hygroscopicity is very low and practically no caking results even at moisture content of 8 to 10% when subjected to 15 pounds per sq. in. pressure.

*Example VI*

To illustrate the agglomerating effect of the partially reacted urea formaldehyde solution in producing homogeneous particles, a sample 20–10–5 ($N-P_2O_5-K_2O$) fertilizer composition (a) produced according to the present invention, and (b) a comparative mechanical mixture made by using identical materials, however, with the urea formaldehyde condensation products added as a finely ground dry compound were subjected to screen analysis. The results are as follows:

| U.S. screen | Percent agglomerated product—A | Percent dry mechanical mixture—B |
| --- | --- | --- |
| +10 | 1.4 | 0 |
| −10+20 | 64.2 | 1.7 |
| −20+40 | 21.2 | 31.9 |
| −40+70 | 8.4 | 30.2 |
| −70+100 | 1.7 | 11.2 |
| −100 | 2.5 | 24.5 |

The agglomerated product has a greater percentage in the desirable −10+70 mesh range without any appreciable −100 dust fraction and is homogeneous in composition.

*Example VII*

To illustrate the greater resistance to leaching by impregnating the urea formaldehyde solution between layers of the micaceous plates of vermiculite, two identical samples of 25N–0–0 ($N-P_2O_5-K_2O$) product were produced, (I) with the standard grate No. 4 (−16+100) vermiculite; and (II) with No. 4 grade pulverized to a fine powder by repeated runs through a pulverizing mill. In addition, (III) a mixture of urea and No. 4 vermiculite at a nitrogen concentration of 25% was prepared for comparison in these studies. In each case a one-gram sample was placed on filter paper and subjected to six repeated leachings with 6 ml. portions of distilled water. In each of a series of tests, each sample was allowed to drain between each leaching so that practically all free water was removed. Each extract was analyzed for nitrogen and the cumulative percent of the total nitrogen extracted is given in the following table.

PERCENT OF TOTAL NITROGEN EXTRACTED

| Extract number | I Standard particles vermiculite | II Pulverized vermiculite | III Urea mixture |
| --- | --- | --- | --- |
| 1 | 8.05 | 9.35 | 77 |
| 2 | 19.2 | 25.3 | 92 |
| 3 | 27. | 34.6 | 98 |
| 4 | 32.6 | 41.7 | 99 |
| 5 | 37.8 | 47.4 | 100 |
| 6 | 43. | 52.3 | 100 |

Results of leachings of samples I and II are plotted on the graph of FIGURE 2.

*Example VIII*

To illustrate the effect of coating ammoniated phosphate with a relatively insoluble urea formaldehyde resin, a 20–10–5 ($N-P_2O_5-K_2O$) product (I) was formulated according to the process of this invention and a product (II) was prepared with the identical ingredients, however, combined as a dry mechanical mixture. A one-gram sample of each was leached with 9–50 ml. portions of distilled water. Approximately all the free water was drained from the sample between each repeated leaching and the extract analyzed for $P_2O_5$ content. The cumulative percent of the total $P_2O_5$ leached from these samples is given in the following table:

| Extract number | I | II |
| --- | --- | --- |
| 1 | 21.2 | 57.3 |
| 2 | 33.7 | 61.0 |
| 3 | 43.7 | 64.1 |
| 4 | 50.2 | 65.3 |
| 5 | 52.7 | 66.9 |
| 6 | 54.6 | 67.5 |
| 7 | 55.8 | 67.7 |
| 8 | 56.9 | 68.3 |
| 9 | 57.8 | 68.9 |

Results are plotted on the graph of FIGURE 3.

The same product formulations were applied at varying rates to creeping bent turf, moist with dew during hot summer weather. The mechanical mixture (II) produced a one-degree burn at the rate of 3.375 pounds per 1000 sq. ft. whereas the standard product processed under this invention produced no full degree of burn at rates up to 6.75 pounds per 1000 sq. ft. Degree of burn is expressed in values of 1 to 10, 0 indicating no burn, 10 complete browning of all foliage. The results of various rates of applications are plotted on the graph of FIGURE 4.

These results conclusively demonstrate the value of the urea formaldehyde resin coating in rendering other ingredients more slowly soluble and in lowering the incidence and degree of burn to turf.

*Example IX*

To illustrate the effect of No. 4 vermiculite on the bulk density of the product, a 25–0–0 ($N-P_2O_5-K_2O$) product (I) was produced by the method of this invention using Zonolite #4 vermiculite. For comparison a sample designated product (II) was formulated using identical materials, however, with the #4 vermiculite pulverized so that all would pass a 100-mesh screen. The bulk density of the two products is as follows:

|  | Bulk density (loose volume), lb./cu. ft. |
| --- | --- |
| I. Standard product | 16.2 |
| II. Product with pulverized vermiculite | 22.4 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method for preparing a fertilizer composition which comprises adjusting the pH of a urea-formaldehyde solution containing urea and formaldehyde in approximately a 1–3:1 mol ratio to a pH value of about 7–9.5 to form a methylol ureas solution, and acidifying the solution to a pH of approximately 3.0–4.0 and coating and impregnating particles of expanded vermiculite with said solution by dispersing the solution in a sufficiently flowable state to permit impregnation of said particles while mixing under conditions sufficient to cause the ingredients thereof to undergo a condensation reaction to form a partially insoluble resinous methylene ureas nitrogen-containing reaction product in situ about said particles, said mixture being buffered by said vermiculite to a final pH range of approximately 4.5 to 6.5 whereby said fertilizer composition has at least 1/3 of the total nitrogen in water insoluble form with an availability index of at least 35%.

2. A method as defined in claim 1, wherein an alkaline modified phosphatic buffering material is added to the mixture to buffer the product to a pH of approximately 4.5 to 6.5.

3. A method as defined in claim 1 wherein said carrier material and urea-formaldehyde solution are also mixed with at least one solid fertilizer ingredient.

4. A method as defined in claim 1, wherein said expanded vermiculite is at a temperature of at least 15° C. prior to dispersing said urea-formaldehyde solution thereon; said vermiculite being dried after being coated and impregnated with said reaction product; approximately 20 to 70% of the drier output being recycled to the mixing stage of the process to provide a desired liquid to solid ratio.

5. A method for preparing a fertilizer composition which comprises adjusting the pH of a methylol ureas solution containing urea and formaldehyde in approximately a 1-3:1 mol ratio to a pH value of about 7-9.5, and coating and impregnating particles of expanded porous silicateous carrier material with said solution by mixing with said particles said solution while acidifying to a pH of 3.0-4.0, said mixing being carried out under conditions sufficient to cause the ingredients thereof to undergo a condensation reaction to form a partially insoluble resinous methylene ureas nitrogen-containing reaction product in situ about said particles, said mixture being buffered to a final pH range of approximately 4.5 to 6.5 whereby said fertilizer composition has at least 1/3 of the total nitrogen in water insoluble form with an availability index of at least 35%.

6. A method as defined in claim 5, wherein said carrier material and urea-formaldehyde solution are mixed with at least one fertilizer ingredient.

7. A method for preparing a fertilizer composition having at least 1/3 of the nitrogen in water insoluble form with an availability index of at least 35% and a final pH of about 4.5 to 6.5, said method comprising coating and impregnating particles of expanded porous silicateous carrier with a solution of methylol ureas by dispersing said solution on a mixture of carrier material and at least one solid fertilizer ingredient, said carrier material and fertilizer mixture having a pH in the range of 3.0 to 6.5, and mixing said solution with said carrier material and fertilizer under conditions sufficient to cause the ingredients of said solution to undergo a condensation reaction to form a partially insoluble resinous methylene ureas nitrogen-containing reaction product in situ about said carrier particles.

8. A method as defined in claim 2, wherein said buffering agent is selected from the group consisting of dicalcium phosphate, triple superphosphate, and superphosphate and said alkaline material is selected from the group consisting of ammonia, hydrated lime, and sodium carbonate.

9. A lightweight, granular fertilizer composition having at least 1/3 of the total nitrogen in water insoluble form with an availability index of at least 35% comprising expanded porous silicateous carrier particles coated and impregnated with a urea-formaldehyde condensation product, said composition produced by the method comprising the steps of combining said carrier particles with a solution of methylol ureas having a pH value of about 7-9.5 and adjusting the pH value of the mixture within the range of 3.0-6.5 and promoting condensation-reaction of said methylol ureas under conditions sufficient to cause the formation of partially insoluble resinous nitrogen-containing reaction product in situ in and about said carrier particles, said fertilizer composition being buffered to a final pH of approximately 4.5 to 6.5.

References Cited in the file of this patent

UNITED STATES PATENTS

| | | |
|---|---|---|
| 2,618,546 | Davenport | Nov. 18, 1952 |
| 2,669,510 | Dresser | Feb. 16, 1954 |
| 2,766,283 | Darden | Oct. 9, 1956 |
| 2,779,670 | Burkett | Jan. 29, 1957 |
| 2,810,710 | Long | Oct. 22, 1957 |
| 2,816,826 | Schmitz et al. | Dec. 17, 1957 |